United States Patent
Jordan

(10) Patent No.: US 12,124,356 B2
(45) Date of Patent: Oct. 22, 2024

(54) LIGHTWEIGHT SOFTWARE TEST LIBRARY FOR VEHICLE COMPUTE HARDWARE COVERAGE TESTING

(71) Applicant: GM Cruise Holdings LLC, San Francisco, CA (US)

(72) Inventor: Edmond Jordan, San Jose, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 66 days.

(21) Appl. No.: 18/051,260

(22) Filed: Oct. 31, 2022

(65) Prior Publication Data

US 2024/0143484 A1    May 2, 2024

(51) Int. Cl.
*G06F 11/36* (2006.01)

(52) U.S. Cl.
CPC ...... *G06F 11/3676* (2013.01); *G06F 11/3664* (2013.01); *G06F 11/3688* (2013.01)

(58) Field of Classification Search
CPC ............. G06F 11/3676; G06F 11/3664; G06F 11/3688
USPC ............................... 717/124–140; 706/25–45
See application file for complete search history.

(56) References Cited

U.S. PATENT DOCUMENTS

| | | | | |
|---|---|---|---|---|
| 5,731,991 A * | 3/1998 | Kinra | ................... | G06F 11/3452 706/920 |
| 6,442,457 B1 * | 8/2002 | Jones | ................... | G01L 5/28 701/33.2 |
| 7,742,939 B1 * | 6/2010 | Pham | ................... | G06F 8/77 705/7.39 |
| 8,843,878 B1 * | 9/2014 | Grundner | ........... | G06Q 10/0631 717/124 |
| 9,710,775 B2 * | 7/2017 | Jayaraman | ......... | G06Q 10/0635 |
| 10,162,740 B1 * | 12/2018 | Setty | ................... | G06F 9/44505 |
| 10,599,546 B1 * | 3/2020 | Walther | .............. | G06F 11/3457 |
| 10,740,216 B1 * | 8/2020 | Parent | .................... | G06N 20/00 |
| 10,803,324 B1 * | 10/2020 | Shen | .................... | G06V 20/582 |
| 11,055,209 B2 * | 7/2021 | Hu | ......................... | G06F 9/455 |
| 11,204,858 B1 * | 12/2021 | Barash | ................ | G06F 11/3688 |
| 11,405,462 B1 * | 8/2022 | Puchalski | .............. | H04L 67/10 |
| 11,415,997 B1 * | 8/2022 | Dolan | ................. | G06F 11/3688 |
| 11,545,241 B1 * | 1/2023 | Holmes | ............ | G06Q 10/06311 |

(Continued)

OTHER PUBLICATIONS

Kim et al, "SPLat: Lightweight Dynamic Analysis for Reducing Combinatorics in Testing Configurable Systems", ACM, pp. 257-267 (Year: 2013).*

(Continued)

*Primary Examiner* — Anil Khatri
(74) *Attorney, Agent, or Firm* — Michael DiCato

(57) ABSTRACT

Systems and methods for vehicle hardware coverage testing are provided. For instance, a vehicle includes a memory to store a vehicle compute software and a hardware coverage test software associated with the vehicle compute software. The vehicle includes a timer configured based on a timer period and one or more processing units to execute the vehicle compute software using hardware resources of the one or more processing units. Responsive to an expiration of the timer, the one or more processing units execute the hardware coverage test software to test only the hardware resources used by the vehicle compute software and determine whether there is a failure associated with the hardware resources used by the vehicle compute software.

18 Claims, 7 Drawing Sheets

(56) References Cited

U.S. PATENT DOCUMENTS 11,561,690 B2 * 1/2023 Lekivetz ............. G06F 3/04847
12,013,704 B2 * 6/2024 Nagy ................... G05D 1/0217

OTHER PUBLICATIONS

Groce et al, "Lightweight Automated Testing with Adaptation-Based Programming", IEEE, pp. 161-170 (Year: 2012).*
Tuncali et al, "Requirements-Driven Test Generation for Autonomous Vehicles With Machine Learning Components", IEEE, pp. 265-280 (Year: 2020).*
Groce at al, "Lightweight Automated Testing with Adaptation-Based Programming", IEEE, pp. 161-170 (Year: 2012).*
Liu et al, "Lightweight Deep Learning for Resource-Constrained Environments: A Survey", ACM, pp. 1-42 (Year: 2024).*
Mundhenk et al, "Security in Automotive Networks: Lightweight Authentication and Authorization", ACM, pp. 1-27 (Year: 2017).*

* cited by examiner

LIGHTWEIGHT SOFTWARE TEST LIBRARY FOR VEHICLE COMPUTE HARDWARE COVERAGE TESTING

BACKGROUND

1. Technical Field

The present disclosure generally relates to autonomous vehicle and, more specifically, to generation and application of a lightweight software test library (STL) for vehicle compute hardware coverage testing.

2. Introduction

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating the vehicles in making driving decisions. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
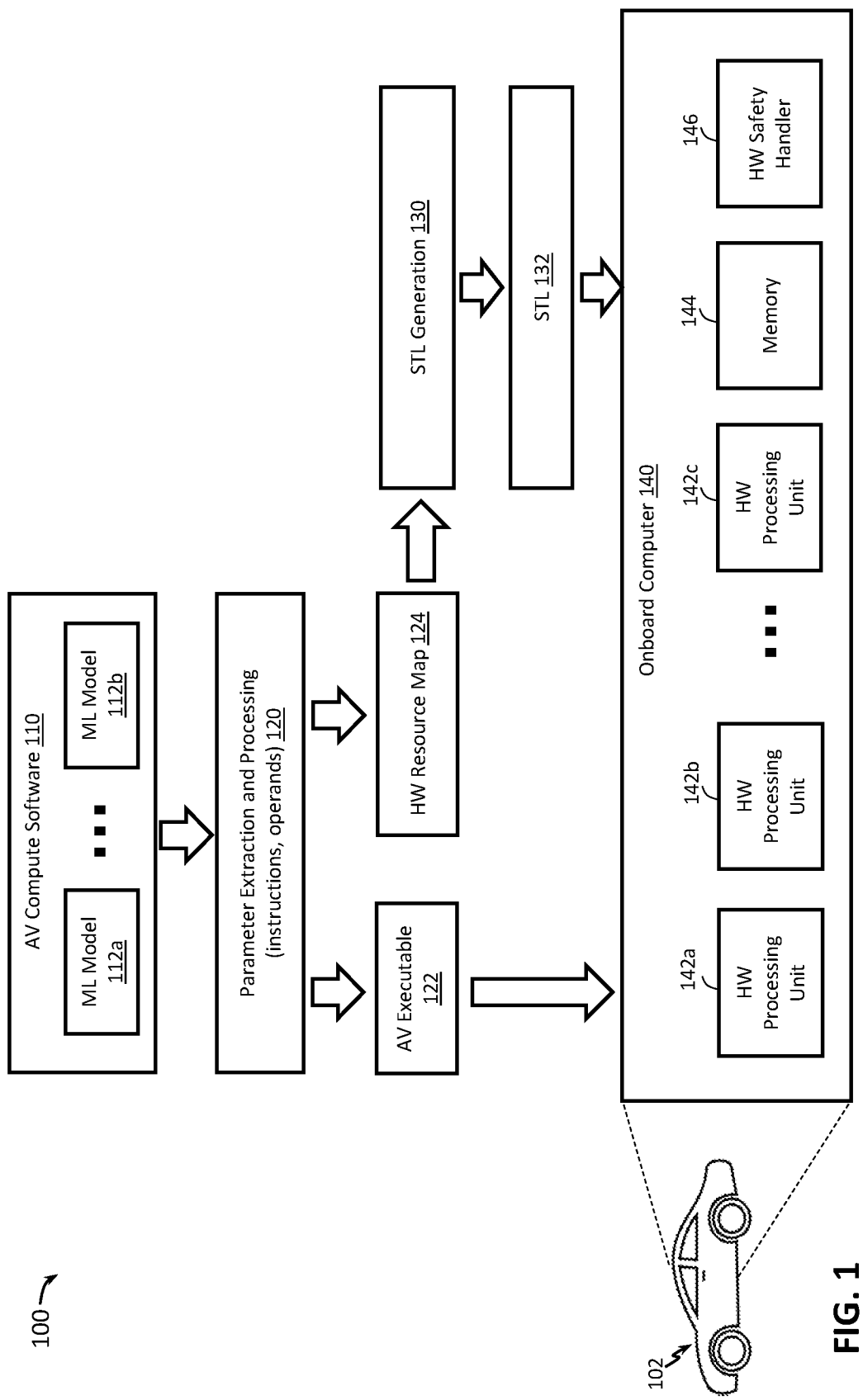
FIG. 1 illustrates an exemplary autonomous vehicle (AV) hardware coverage test scheme, according to some examples of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Autonomous vehicles (AVs) can provide many benefits. For instance, AVs may have the potential to transform urban living by offering opportunity for efficient, accessible and affordable transportation. An AV may be equipped with various sensors to sense an environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from a starting position to a destination). As part of planning, the AV may access map information and localize itself based on location information (e.g., from location sensors) and the map information. Subsequently, instructions can be sent to a controller to control the AV (e.g., for steering, accelerating, decelerating, braking, etc.) according to the planned path.

The operations of perception, prediction, planning, and control at an AV may be implemented using a combination of hardware and software components. For instance, an AV stack or AV compute process performing the perception, prediction, planning, and control may be implemented as software code or firmware code. The AV stack or AV compute process (the software and/or firmware code) may be executed on processor(s) (e.g., general processors, central processors (CPUs), graphical processors (GPUs), digital signal processors (DSPs), ASIC, etc.) and/or any other hardware processing components on the AV. Additionally, the AV stack or AV compute process may communicate with various hardware components (e.g., onboard sensors and control system of the AV) and/or with an AV infrastructure over a network.

Developments in automotive and/or AV technologies have led to a development of standards within the automotive community to advance the state of automotive and/or AV technologies and to use and/or design automotive equipment, component, and/or system that is functionally safe. An example of such a standard is the international organization for standardization (ISO) 26262. The ISO 26262 standard describes, among other things, four automotive safety integrity levels (ASIL). The four ASILs refer to four levels of safety risk in an automotive system, device, or a component of such a system. The four ASILs range from ASIL A, which represents the lowest degree of automotive hazard, to ASIL D, which represents the highest degree of automotive hazard. Automotive components, devices, and/or systems can be designed to comply with one or more of the ASIL levels.

Each ASIL may define various metrics, for example, each representing a number of a certain type of faults that is covered or handled by a safety feature on an automotive equipment, component, or system under operation. That is, the metrics can provide indications of the robustness of a hardware design of the automotive equipment, component, or system. One example of such metrics is a single point fault metric (SPFM), which measures the robustness of a component to single-point and residual faults. For instance, an ASIL B component can have an SPFM of greater than a certain percentage (e.g., 90%) and an ASIL D component can have an SPFM of greater than that of ASIL B (e.g., 99%). Thus, for an ASIL D component, as an example, 99% of single point faults can be covered or handled by a safety feature on the automotive component or system. Another example of such metrics is a latent fault metric (LFM), which measures the robustness of the component to latent faults. For instance, an ASIL B component can have an LFM of greater than a certain percentage (e.g., 60%) and an ASIL D component can have an LFM of greater than that of ASIL B (e.g., 90%). The following table illustrates example SPFMs and LFMs for various ASILs described in ISO 26262:

TABLE 1

SPFM and LFM for various ASILs

|  | ASIL B | ASIL C | ASIL D |
|---|---|---|---|
| SPFM | >90% | >97% | >99% |
| LFM | >60% | >80% | >90% |

Accordingly, there is a need to provision for hardware coverage testing for AV hardware as part of an AV design. According to aspects of the present disclosure, a software test library (STL) can be executed on a vehicle (e.g., an AV) to perform vehicle hardware coverage testing along with a vehicle compute software (e.g., that performs perception, prediction, planning, and/or control to make a driving decision) when the vehicle is in operation (e.g., in a driving mode or generally operating in a physical real-world). The STL may include operations that test the vehicle hardware (e.g., hardware compute resources such as math processing units, machine learning (ML) engines, memory, etc.) used for executing the vehicle compute software. According to an aspect of the present disclosure, a vehicle can execute a vehicle compute software and an STL for vehicle hardware coverage testing in a time slicing manner during operation. That is, the vehicle may execute the vehicle compute software and the STL at different times. As such, the execution of the STL may consume hardware resources that can otherwise be consumed by the vehicle compute software. Thus, providing a full hardware coverage test may be impractical and can be expensive (in terms of hardware resources).

Disclosed herein are mechanisms for generating a lightweight STL that utilizes a minimum amount of hardware resources yet providing a vehicle compute hardware test coverage satisfying a certain target. More specifically, the STL may be designed specifically (or customized) for a particular vehicle compute software that is to be executed on the vehicle compute hardware (e.g., processors such as central processing units (CPUs), graphical processing units (GPUs), DSPs, application specific instruction processors (ASIPs), ML engines and/or accelerators, etc.). As used herein, a lightweight STL may refer to an STL that can test hardware resources used by a vehicle compute software with a reduced list of instructions based on instructions and/or data of the respective vehicle compute software. Stated differently, the STL is specifically designed to invoke and/or test the hardware resources used by the vehicle compute software but may include a smaller number of instructions than the vehicle compute software. In some examples, the STL can include one or more functions or function calls that invoke a subset of the instructions and/or data used by the vehicle compute software. In some instances, the STL may be referred to as a hardware coverage test software. The present disclosure may use the terms "vehicle compute software," "vehicle compute software code," and "AV code" interchangeably to refer to any one or more software components within an AV software stack (that performs perception, prediction, path planning, and control).

According to aspects of the present disclosure, an STL for vehicle hardware coverage testing can be generated offline and deployed on a vehicle together with a corresponding vehicle compute software. The STL may be designed specifically for the vehicle compute software. For instance, a computer-implemented system may receive a vehicle compute software code including a list of instructions for execution by a vehicle having a plurality of hardware compute resources. The computer-implemented system may generate a reduced list of instructions based on the list of instructions in the vehicle compute software code. As part of generating the reduced list of instructions, the computer-implemented system may remove at least a first instruction from the list of instructions based on a second instruction in the list of instructions uses the same hardware compute resource of the plurality of hardware compute resources as the first instruction. The computer-implemented system may generate a hardware coverage test software (e.g., an STL) based on the reduced list of instructions. The computer-implemented system may output the hardware coverage test software. The hardware coverage test software can be deployed in a vehicle along with the vehicle compute software for real-time operations.

In some aspects, as part of generating the reduced list of instructions, the computer-implemented system may extract parameters (e.g., instructions and/or operands) from the vehicle compute software code. In some instances, a compiler may compile the vehicle compute software code and output a hardware resource map mapping each instruction in the vehicle compute software code to a hardware compute resource that may be used for the execution of the respective instruction. Accordingly, the computer-implemented system may determine which of the instructions in the vehicle compute software code are redundant. For instance, the computer-implemented system may analyze the hardware resource map and determine that the first instruction and the second instruction use the same hardware compute resources, and the removal of the first instruction can be based on the determination. Further, in some aspects, the computer-implemented system may also consider the operands (or data) used by a respective instruction when determining which of the instructions is redundant. For instance, the first instruction may operate on a first operand, and the computer-implemented system may remove the first instruction from the list of instructions further based on the second instruction operates on a second operand having the same operand type (e.g., having the same data bit-width) as the first operand. In general, an instruction is redundant if the vehicle compute software includes another instruction having the same instruction code or type and/or the same operand type, and uses the same hardware resources as the instruction.

In some aspects, the vehicle compute software may implement one or more ML models (e.g., trained for vehicle perception, prediction, planning, and/or control). Accordingly, the first instruction may be associated with an ML operation (e.g., a multiply-accumulate (MAC) operation, a filtering operation, a mean-squared error (MSE), a matrix operation, etc.), and the computer-implemented system may remove the first instruction further based on the second instruction is associated with the same ML operation.

In some aspects, the execution of the vehicle compute software may use a subset of the plurality of hardware compute resources that is less than all of the plurality of hardware compute resources of the vehicle. To reduce execution time, the hardware coverage test software may include instructions that use the subset of the plurality of hardware compute resources instead of all the hardware compute resources. Stated differently, the hardware coverage test software may only test hardware resources that are used by the vehicle compute software.

In some aspects, the computer-implemented system may generate the hardware coverage test software further based on a target hardware coverage (e.g., a certain functional safety level according to a certain standard such as the ISO 26262).

In some aspects, the hardware compute resource used by the first instruction and the second instruction may correspond to one of a plurality of GPUs at the vehicle. That is, the hardware compute resources are tested at a processor core (or GPU) level. In other aspects, the hardware compute resource used by the first instruction and the second instruction may correspond to a math processing unit of a plurality of math processing units within a GPU at the vehicle. That is, the hardware compute resources are tested at a processing unit level (e.g., for a finer granularity test).

According to a further aspect of the present disclosure, a vehicle may execute a vehicle compute software and a hardware coverage test software while in an operational mode (e.g., a driving mode). The hardware coverage test software may be designed specifically for the vehicle compute software (e.g., generated as discussed herein to test hardware resources used for executing the vehicle compute software) The vehicle may execute the vehicle compute software and the hardware coverage test software in a time slicing manner. For instance, the vehicle may further include a timer configured based on a timer period. The vehicle may further include one or more processing units to execute the vehicle compute software using hardware resources of the one or more processing units. Responsive to an expiration of the timer, the one or more processing units may execute the hardware coverage test software to determine whether there is a failure associated with the hardware resources used by the vehicle compute software. To that end, the hardware coverage test software may be executed using the same hardware resources as the vehicle compute software. In some aspects, the memory may also store calculation results generated by the execution of the hardware coverage test software. In some aspects, the timer may be a periodic timer. For instance, the timer period may be based on a certain functional safety standard (e.g., requiring a certain response time upon detection of a hardware fault). In another example, the timer period may be based on the ISO 26262. In a further example, the timer period may be based on a certain schedule (e.g., a daily schedule) for which the vehicle hardware may be tested.

In some aspects, the vehicle compute software may include a greater number of instructions than the hardware coverage test software. Stated differently, the hardware coverage test software may include a reduced set of instructions compared to the vehicle compute software. For instance, the vehicle compute software may include at least a first instruction and a second instruction that are executed by the same hardware resource of the hardware resources, and the hardware coverage test software may include the first instruction but not the second instruction (based on the second instruction is executed by the same hardware resource as the first instruction)

In some aspects, the vehicle compute software may include one or more ML models, where the one or more ML models (e.g., for vehicle perception, prediction, planning, and/or control) may utilize instructions of different instruction types provided by the one or more processing units. To reduce resources used by the hardware coverage test software, the hardware coverage test software may include a single instruction instance of each of the different instruction types.

In some aspects, the vehicle may further include a hardware failure handling component, and the one or more processing units may monitor for a hardware fault or failure at the hardware resources (used by the vehicle compute software) based on the execution of the hardware coverage test software. Upon detecting a hardware fault, the one or more processing units may report the hardware failure to the hardware failure handling component.

The systems, schemes, and mechanisms described herein can advantageously generate a lightweight STL (the hardware coverage test software) automatically for testing vehicle hardware compute resources that are used for executing a particular vehicle compute software (e.g., AV software stack). An STL that is designed or generated specifically (or customized) for a vehicle compute software can effectively test only hardware compute resources used by the vehicle compute software and not having to waste unnecessary processing time testing hardware compute resources that are not used for the particular vehicle compute software. Removing redundant instructions can provide the hardware test coverage needed for a certain functional safety standard (e.g., the ISO 26262) but without invoking the same hardware resources multiple times. Further, testing hardware coverage by using a software approach (e.g., by executing an STL) can allow for flexibility in hardware coverage testing. For instance, if a vehicle compute software or a particular ML model within the vehicle compute software is updated, a new STL can be generated specifically for the updated vehicle compute software. Accordingly, each vehicle compute software code or version may have an associated STL. Thus, an upgrade to a vehicle compute software may include both the vehicle compute software itself and an associated STL.

FIG. 1 illustrates an exemplary AV hardware coverage test scheme 100, according to some examples of the present disclosure. At a high level, the scheme 100 may include an AV compute software 110 to be deployed on an AV 102 for driving in a physical roadway system. The AV compute software 110 may be executed by an onboard computer 140 of the AV 102. The scheme 100 may generate an STL 132 to test hardware resources on the onboard computer 140 that are used for executing the AV compute software 110. That is, the STL 132 may be generated specifically for the vehicle compute software 110. During operation, the AV 102 may execute the AV compute software 110 and the STL 132 in a time slicing manner.

As shown in FIG. 1, an AV compute software 110 may include a plurality of ML models 112 (individually shown as 112a, . . . , 112b). In general, the AV compute software 110 can include any suitable number of ML models 112 (e.g., 3, 4, 5, 6, or more). The ML models 112 may be used by various compute tasks related to determining a driving decision for the AV 102. For instance, the ML models can be used for perception, prediction, path planning, and/or control as will be discussed more fully below. The AV compute software 110 may also include other components implementing various algorithms related to determining a driving decision for the AV 102 and/or controlling the driving of the AV 102.

The AV 102 may be a fully autonomous vehicle or a semi-autonomous vehicle. A fully autonomous vehicle may make driving decisions and drive the vehicle without human inputs. A semi-autonomous vehicle may make at least some driving decisions without human inputs. In some examples, the AV 102 may be a vehicle that switches between a semi-autonomous state and a fully autonomous state and thus, the AV 102 may have attributes of both a semi-autonomous vehicle and a fully autonomous vehicle depending on the state of the vehicle.

As will be discussed more fully below with reference to FIG. 6, the AV 102 may include various sensors and the onboard computer 140 (e.g., a local computing device). The sensors may include a wide variety of sensors, which may broadly categorize into a computer vision ("CV") system, localization sensors, and driving sensors. As an example, the AV 102's sensors may include one or more cameras. The one or more cameras may capture images of the surrounding environment of the AV 102. In some instances, the sensor may include multiple cameras to capture different views, e.g., a front-facing camera, a back-facing camera, and side-facing cameras. In some instances, one or more cameras may be implemented using a high-resolution imager with a fixed mounting and field of view. One or more cameras may have adjustable field of views and/or adjustable zooms. In some embodiments, the cameras may capture images continually or at some intervals during operation of the AV 102. The cameras may transmit the captured images to the onboard computer 140 for further processing, for example, to assist the AV 102 in determining certain action(s) to be carried out by the AV 102.

Additionally or alternatively, the AV 102's sensors may include one or more light detection and ranging (LIDAR) sensors. The one or more LIDAR sensors may measure distances to objects in the vicinity of the AV 102 using reflected laser light. The one or more LIDAR sensors may include a scanning LIDAR that provides a point cloud of the region scanned. The one or more LIDAR sensors may have a fixed field of view or a dynamically configurable field of view. The one or more LIDAR sensors may produce a point cloud (e.g., a collection of data points in a 3D space) that describes the shape, contour, and/or various characteristics of one or more objects (e.g., buildings, trees, other vehicles, pedestrian, cyclist, road signs, etc.) in the surrounding of the AV 102 and a distance of the object away from the AV 102. The one or more LIDAR sensors may transmit the captured point cloud to the onboard computer 140 for further processing, for example, to assist the AV 102 in determining certain action(s) to be carried out by the AV 102.

Additionally or alternatively, the AV 102's sensors may include one or more radio detection and ranging (RADAR) sensors. RADAR sensors may operate in substantially the same way as LIDAR sensors, but instead of the light waves used in LIDAR sensors, RADAR sensors use radio waves (e.g., at frequencies of 24, 74, 77, and 79 gigahertz (GHz)). The time taken by the radio waves to return from the objects or obstacles to the AV 102 is used for calculating the distance, angle, and velocity of the obstacle in the surroundings of the AV 102.

Additionally or alternatively, the AV 102's sensors may include one or more location sensors. The one or more location sensors may collect data that is used to determine a current location of the AV 102. The location sensors may include a global positioning system (GPS) sensor and one or more inertial measurement units (IMUs). The one or more location sensors may further include a processing unit (e.g., a component of the onboard computer 140, or a separate processing unit) that receives signals (e.g., GPS data and IMU data) to determine the current location of the AV 102. The location determined by the one or more location sensors can be used for route and maneuver planning. The location may also be used to determine when to capture images of a certain object. The location sensor may transmit the determined location information to the onboard computer 140 for further processing, for example, to assist the AV 102 in determining certain action(s) to be carried out by the AV 102.

In general, the AV 102's sensors may include any suitable sensors including but not limited to, photodetectors, one or more cameras, RADAR sensors, sound navigation and ranging (SONAR) sensors, LIDAR sensors, GPS, wheel speed sensors, weather sensors, IMUs, accelerometers, microphones, strain gauges, pressure monitors, barometers, thermometers, altimeters, etc. Further, the sensors may be located in various positions in and around the AV 102.

As further shown in FIG. 1, the AV 102's onboard computer 140 may include a plurality of hardware (HW) processing units 142 (shown as 142*a*, 142*b*, ..., 142*c*), a memory 114, and a hardware safety handler component 146. The HW processing units 142 may include various processors (e.g., CPUs, GPUs, DSPs, ASIPs, ML engines and/or accelerators, etc.). The HW processing units 142 may generally be any programmable elements that can execute software instruction codes. While not shown, the onboard computer 140 may include other hardware non-programmable computational components (e.g., application-specific integrated circuits (ASICs)). In some instances, the AV 102's onboard computer 140 may be substantially similar to the system 700 of FIG. 7. In an example, the onboard computer 140 may receive data collected from the AV 102's sensors and may store the collected sensor data at the memory 144. The AV compute software 110 may be executed using one or more the HW processing units 142 to determine a driving decision based on the collected sensor data. To that end, the AV compute software 110 when executed may perform the tasks of perception, prediction, planning, and/or control.

For perception, the AV compute software 110 may analyze the collected sensor data (e.g., camera images, point clouds, location information, etc.) and output an understanding or a perception of the environment surrounding the AV 102. In particular, the AV compute software 110 may extract, from the sensor data, information related to navigation and making driving decisions. For instance, the AV compute software 110 may detect objects including, but not limited to, cars, pedestrians, trees, bicycles, and objects traveling on or near the roadway systems on which the AV 102 is traveling. Further, in some examples, as part of performing the perception, the AV compute software 110 may implement one or more classifiers (e.g., the ML model(s) 112 may be trained for classification) to identify particular objects. For example, a multi-class classifier may be used to classify each object in the environment of the AV 102 as one of a set of potential objects, e.g., a vehicle, a pedestrian, or a cyclist. As another example, a pedestrian classifier may recognize pedestrians in the environment of the AV 102, a vehicle classifier may recognize vehicles in the environment of the AV 102, etc.

For prediction, the AV compute software 110 may perform predictive analysis on at least some of the recognized objects, e.g., to determine projected pathways of other vehicles, bicycles, and pedestrians. The AV compute software 110 may also predict the AV 102's future trajectories, which may enable the AV 102 to make appropriate navigation decisions. In some examples, the AV compute software 110 may utilize one or more prediction models (e.g., the ML model(s) 112) to determine future motions and/or trajectories of other traffic agents and/or of the AV 102 itself.

For AV planning, the AV compute software 110 may plan maneuvers for the AV 102 based on map data, perception data, prediction information, and navigation information, e.g., a route instructed by a fleet management system. In some examples, the AV compute software 110 also receive map data from a map database (e.g., stored locally at the AV 102 or at a remote server) including data describing roadways (e.g., locations of roadways, connections between roadways, roadway names, speed limits, traffic flow regulations, toll information, etc.), buildings (e.g., locations of buildings, building geometry, building types), and other objects (e.g., location, geometry, object type). In general, as part of planning, the AV compute software 110 may determine a pathway for the AV 102 to follow. When the AV compute software 110 detects moving objects in the environment of the AV 102, the AV compute software 110 may determine the pathway for the AV 102 based on predicted behaviors of the objects provided by the prediction (e.g., computed by the ML model(s) 112) and right-of-way rules that regulate behavior of vehicles, cyclists, pedestrians, or other objects. The pathway may include locations for the AV 102 to maneuver to, and timing and/or speed of the AV 102 in maneuvering to the locations.

For AV control, the AV compute software 110 may send appropriate commands to instruct movement-related subsystems (e.g., actuators, steering wheel, throttle, brakes, etc.) of the AV 102 to maneuver according to the pathway determined by the planning.

Figure 2:
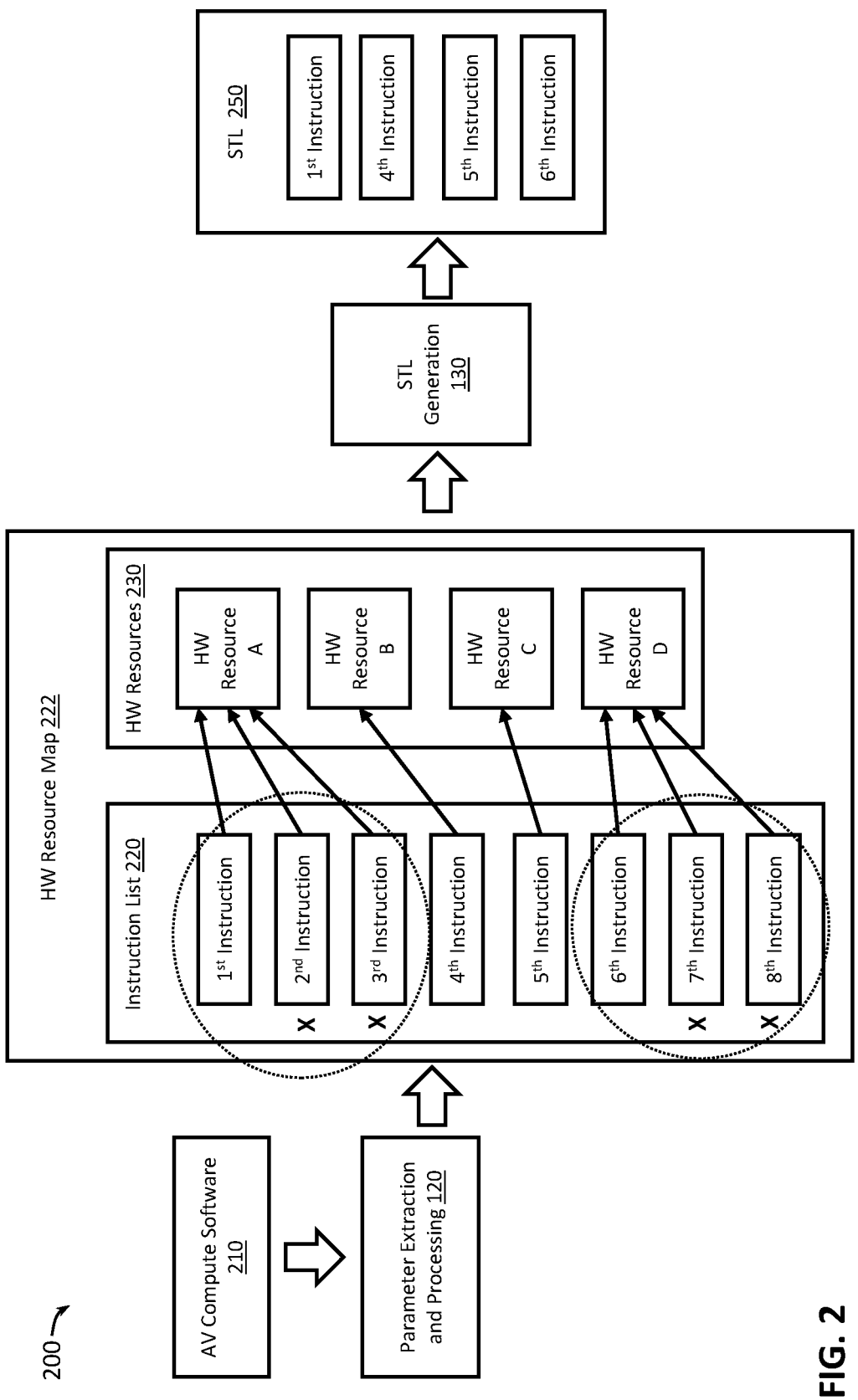
FIG. 2 illustrates a software test library (STL) generation scheme for AV hardware coverage testing, according to some examples of the present disclosure.

As further shown in FIG. 1, the AV compute software 110 can be processed by a parameter extraction and processing block 120. The AV compute software 110 may include a list of instructions (e.g., for computations and/or operations of the ML models 112). The instructions may operate on operand(s) (e.g., data). The parameter extraction and processing block 120 may extract instructions and/or operands from the AV compute software 110. The parameter extraction and processing block 120 may further process the extracted instructions and/or operands to generate an AV executable 122 and a HW resource map 124. The AV executable 122 may be a binary image that can be downloaded ono the onboard computer 140 for execution by one or more of the HW processing units 142. The HW resource map 124 may map each instruction in the AV compute software 110 to hardware resource(s) of the HW processing units 142 that may be used for the execution of the respective instruction. As an example, the HW processing units 142 may include a large number of MAC processing units (e.g., about 1000, 100,000, millions) and the parameter extraction and processing block 120 may map an operation of a certain ML model 112 to one or more MAC processing units. A more detailed view of an example hardware resource map is shown in FIG. 2.

In some examples, the parameter extraction and processing block 120 may utilize a compiler to compile the AV compute software 110 into the AV executable 122 and to generate the HW resource map 124. More specifically, the AV compute software 110 may include software codes (e.g., instructions) for performing perception, prediction, planning, and/or control. The instructions may be selected from instruction set(s) supported by the HW processing unit(s) 142, and the compiler may map the instructions and associated operands to certain hardware resources of the HW processing unit(s) 142 for execution.

As further shown in FIG. 1, the HW resource map 124 may be provided to an STL generation block 130. The STL generation block 130 may analyze the HW resource map 124 and generate an STL 132 for testing the integrity of the hardware resources (of the HW processing units 142) used for executing the AV compute software 110. That is, the STL 132 may perform hardware coverage testing specifically for hardware resources used by the AV compute software 110. The STL 132 may be downloaded to the onboard computer 140 of the AV 102 and executed along with the AV executable 122 (e.g., the AV compute software 110). As will be discussed more fully below with reference to FIG. 3, the AV compute software 110 and the STL 132 can be executed in a time slicing manner during operation of the AV 102. That is, a HW processing unit 142 may execute instruction(s) o the AV compute software 110 and instruction(s) of the STL 132 at different times. As such, the execution of the STL 132 may consume hardware resources that can otherwise be consumed by the AV compute software 110. Accordingly, it may be desirable to reduce hardware resource usage by the STL 132. That is, it may be desirable to develop a lightweight STL 132.

According to an aspect of the present disclosure, the STL generation block 130 may generate the STL 132 by generating a reduced list of instructions from the list of instructions of the AV compute software 110. As will be discussed more fully below with reference to FIG. 2, the STL generation block 130 may remove any redundant instructions from the list of instructions to reduce a number of instructions to be executed as part of the STL 132 yet testing all (or a target percentage of) hardware resources that are used by the AV compute software 110.

Figure 7:
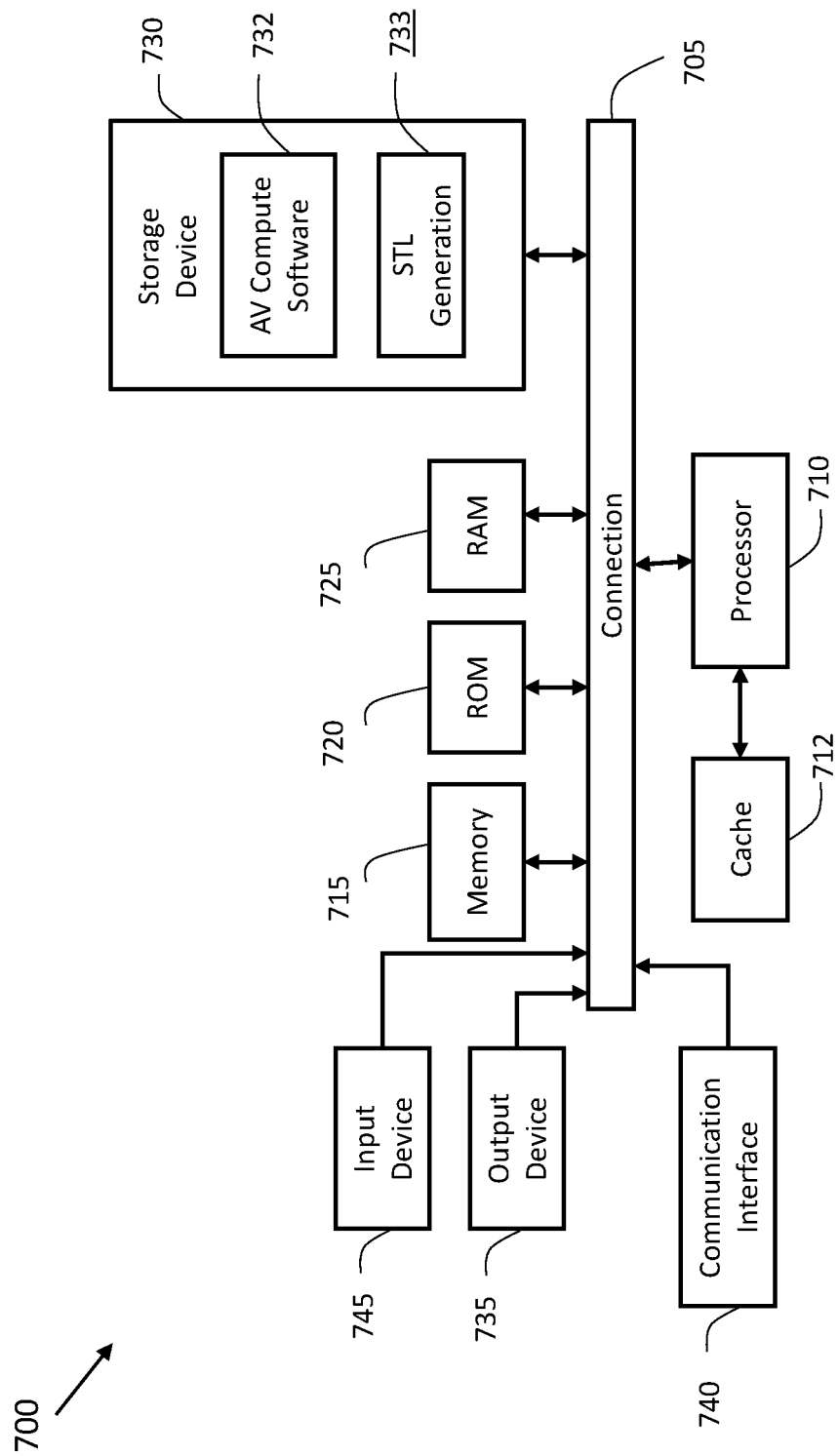
FIG. 7 illustrates an example processor-based system with which some aspects of the subject technology may be implemented.

In some aspects, the generation of the STL 132 can be performed offline by a computer-implemented system (e.g., similar to the system 700 of FIG. 7). That is, the computer-implemented system may include one or more processing units to perform the operations of the parameter extraction and processing block 120 and/or the STL generation block 130 discussed herein.

As further shown in FIG. 1, the AV 102's onboard computer 140 may include a HW safety handler component 146. For example, the execution of the STL 132 may detect a hardware fault at one of the HW processing unit 142 and may report or alert the HW safety handler component 146 about the hardware fault. In response, the HW safety handler component 146 may handle the hardware fault, for example, by instructing a stop to the AV 102, instructing the AV 102 to pull over to the side of the road, or take corrective action by re-calculating previous faulty actions (e.g., to increase reliability), etc.

Figure 3:
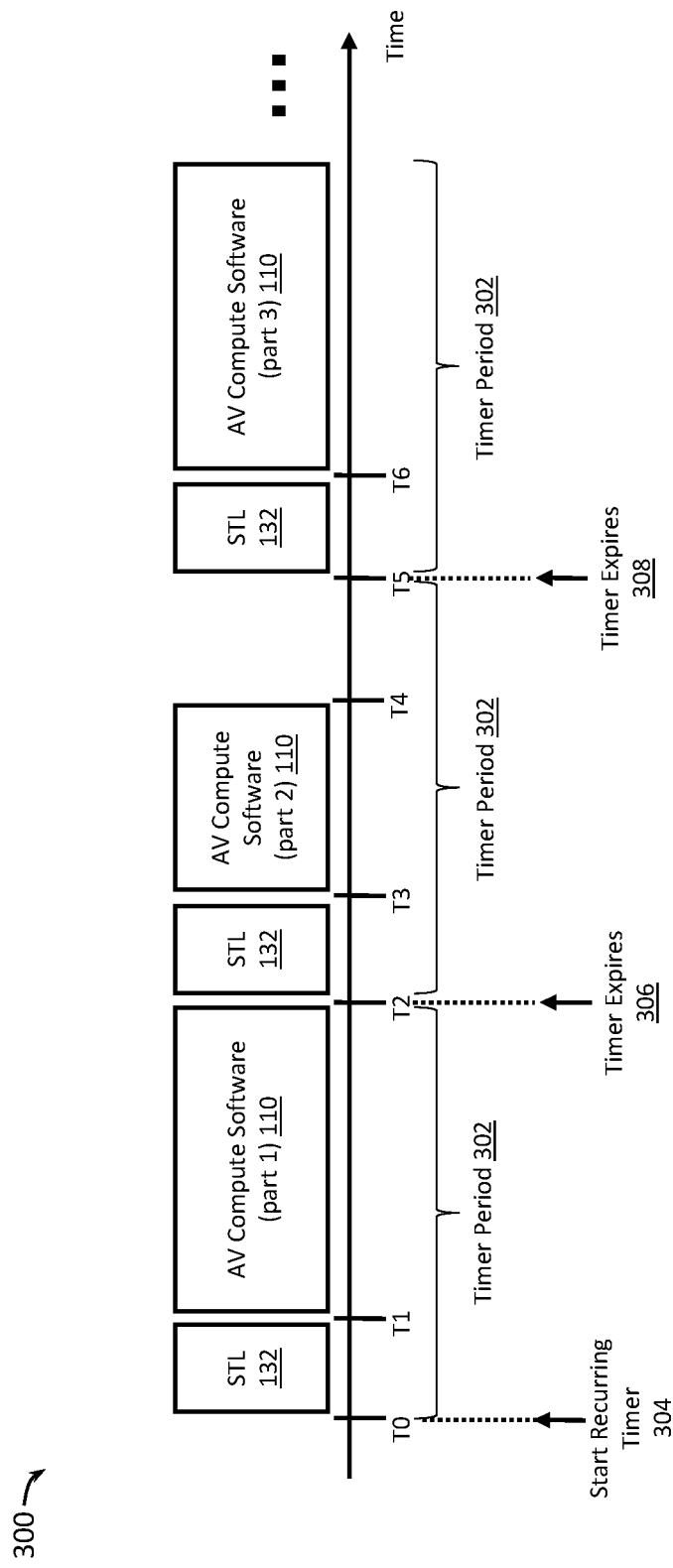
FIG. 3 is a timing diagram illustrating a scheme for executing an STL for AV hardware coverage testing and an AV compute software on a vehicle during operation, according to some examples of the present disclosure.

FIGS. 2 and 3 are discussed in relation to FIG. 1. FIG. 2 illustrates an STL generation scheme 200 for AV hardware coverage testing, according to some examples of the present disclosure. The scheme 200 may utilize the parameter extraction and processing block 120 and the STL generation block 130 to generate an STL 250 for an AV compute software 210. In some instances, the AV compute software 210 and the STL 250 may correspond to the AV compute software 110 and the STL 132 of FIG. 1, respectively. The AV compute software 210 and the STL 250 may be downloaded to the AV 102's onboard computer 140 for execution during operation to determine a driving decision for the AV 102.

As shown in FIG. 2, the parameter extraction and processing block 120 may generate a HW resource map 222 for an AV compute software 210 including a list of instructions (e.g., instructions in the instruction list 220). The HW resource map 222 may be similar to the HW resource map 124. For simplicity, FIG. 2 illustrates the HW resource map 222 including a mapping for an instruction list 220 including eight instructions. However, the instruction list 220 can include any suitable number of instructions (e.g., 50, 100, 200, 500, 1000, 2000, 5000 or more). Further, FIG. 2 illustrates the eight instructions being mapped to four HW resources 230 (shown as HW resource A, HW resource B, HW resource C, and HW resource D). However, the instruction list can be mapped to any suitable number of resources.

In the illustrated example of FIG. 2, the $1^{st}$ instruction, $2^{nd}$ instruction, and $3^{rd}$ instruction are mapped to the HW resource A; the 4th instruction is mapped to the HW resource B 230; the $5^{th}$ instruction is mapped to the HW resource C 230; the $6^{th}$ instruction, the $7^{th}$ instruction, and the $8^{th}$ instruction are mapped to the HW resource D 230. The STL generation block 130 may generate the STL 250 by generating a reduced list of instructions from the instruction list 220.

Because the STL 250 is used as part of a HW coverage test for HW resources that are used to execute the AV compute software 210, there is no need to repeat the execution of an instruction if another instruction has already covered or triggered the same HW resource. Accordingly, for each HW resource used by the AV compute software 210, the STL generation block 130 can keep a single instruction instance that is to be executed by the respective HW resource. In this regard, as part of the generating the reduced list of instructions, the STL generation block 130 may remove the $2^{nd}$ and $3^{rd}$ instructions (shown by the "X" symbols) based on the $2^{nd}$ and $3^{rd}$ instructions use the same HW resource A as the $1^{st}$ instruction. In a similar way, the STL generation block 130 may remove the $7^{th}$ and $8^{th}$ instructions (shown by the "X" symbols) based on the $7^{th}$ and $8^{th}$ instructions use the same HW resource D as the $6^{th}$ instruction. The STL generation block 130 may not remove the $4^{th}$ and $5^{th}$ instructions because there are no other instructions that utilizes the HW resource B and C, respectively. Accordingly, the STL 250 may include the $1^{st}$, $4^{th}$, $5^{th}$, and $6^{th}$ instructions but not the redundant $2^{nd}$, $3^{rd}$, $7^{th}$ and $8^{th}$ instructions.

In some aspects, as part of the generating the reduced list of instructions, the STL generation block 130 may further consider the operands or the data on which an instruction may operate. As an example, the $4^{th}$ instruction and the $5^{th}$ instruction may be of the same instruction type (e.g., a MAC instruction), but the $4^{th}$ instruction may perform a MAC operation for 8-bit data while the $5^{th}$ instruction may perform a MAC operation for 16-bit data. That is, the HW resource A may be an 8-bit MAC processing unit while the HW resource B may be a 16-bit MAC processing unit. Accordingly, the $4^{th}$ instruction and the $5^{th}$ instruction are mapped to different HW resources, and the STL generation block 130 may not remove the $5^{th}$ instruction. As another example, the $4^{th}$ instruction and the $5^{th}$ instruction may be of the same instruction type (e.g., a MAC instruction), but the $4^{th}$ instruction may perform a MAC operation using data from an internal memory (e.g., cache) while the $5^{th}$ instruction may perform a MAC operation using data from an external memory. Accordingly, the $4^{th}$ instruction and the $5^{th}$ instruction are mapped to different HW resources, and the STL generation block 130 may not remove the $5^{th}$ instruction.

In some aspects, the instructions in the instruction list 220 may be ML operations of one or more ML models (e.g., the ML models 112). Some examples for ML operations may include, but not limited to, a MAC operation, a filtering operation, an MSE operation, a matrix add, matrix multiply, etc. In an example, the AV compute software 210 may implement ten ML models, and the STL generation block 130 may generate one STL 250 by taking a union of all operations of the ten ML models to generate a combined list of ML operations and removing a redundant instruction from the combined list based on the redundant instruction uses the same HW resource 230 as another instruction in the combined list. In some instances, the HW resources 230 may correspond to HW resources of ML engines. In other instances, the STL generation block 130 may generate one STL 250 for each ML model.

In some aspects, the STL generation block 130 may generate the STL 250 to test HW resources at a processor core level. For instance, an AV 102's onboard computer 140 can include multiple GPUs (e.g., each corresponding to one of the HW processing units 142), and the STL generation block 130 may analyze the HW resource map 222 to determine which of the GPUs may be used to execute a certain instruction and may remove a redundant instruction based on another instruction (in the instruction list 220) uses the same GPU. In other aspects, the STL generation block 130 may generate the STL 250 to test HW resources at a math processing unit level (e.g., a MAC unit, an adder unit, a multiplier unit, a division unit, a matrix processing unit, etc.), and the STL generation block 130 may analyze the HW resource map 222 to determine which of the GPUs and which of the math processing units within the GPU may be used to execute a certain instruction may remove a redundant instruction based on another instruction (in the instruction list 220) uses the same math processing unit within the same GPU.

In some aspects, the STL generation block 130 may generate the STL 250 to test a subset of HW compute resources less than all of the HW compute resources in the AV 102's onboard computer 140. In some aspects, the STL generation block 130 may generate the STL 250 based on a target hardware coverage. As an example, if the target hardware coverage is 90%, then the STL generation block 130 may generate the STL 250 to test 90% of the HW compute resources in the AV 102's onboard computer 140. In another example, if the target hardware coverage is 90%, then the STL generation block 130 may generate the STL 250 to test 90% of the HW compute resources in the AV 102's onboard computer 140 that is used by the AV compute software 210. In a further aspect, the STL generation block 130 may generate the STL 250 based on a functional safety standard. For example, the functional safety standard may be ISO 26262, and the target hardware coverage may be one of the ASILs.

In some aspects, if the AV compute software 210 is upgraded to a new version, the scheme 200 may be applied to generate a new STL 250 for the upgraded AV compute software 210. In general, each AV compute software version is associated with an STL generated specifically for the AV compute software version based on instructions and/or data used by the AV compute software version.

In general, the scheme 200 may analyze an AV code or AV compute software to consolidate redundant target HW resources used by different software functions and/or different ML software to generate a customized lightweight STL to test HW resources used by the AV compute software and exclude HW resources that are not used by the AV compute software from the test.

FIG. 3 is a timing diagram illustrating a scheme 300 for executing an STL for AV hardware coverage testing and an AV compute software on a vehicle during operation, according to some examples of the present disclosure. In FIG. 3, the x-axis represent time in some arbitrary units. While the scheme 300 is discussed in the context of executing the STL 132 and the AV compute software 110 of FIG. 1, the scheme 300 can also be applied to execution of the AV compute software 210 and the STL 250 of FIG. 2. In general, the scheme 300 can be applied to executions of any AV software stack and a corresponding STL (or hardware coverage test software) that tests the HW resources used for executing the AV software stack.

As shown in FIG. 3, the STL 132 and the AV compute software 110 may be executed in a time slicing manner. For instance, the STL 132 and the AV compute software 110 may be downloaded to the AV 102's onboard computer, and the STL 132 may be executed based on a trigger by a timer on the onboard computer 140. For simplicity of discussion, the AV compute software 110 may be executed by a single HW processing unit 142a, which may be a GPU, a CPU, an ML engine, etc. However, in general, the AV compute software 110 may be executed using any suitable number of HW processing units 142 (e.g., 2, 3, 4, 5 or more).

At time T0, a recurring (or periodic) timer at the onboard computer 140 may start as shown by 304. The timer may be configured with a recurring timer period 302. That is, the timer may expire after a timer period 302 and may be automatically restarted again after the expiration. For instance, at time T0, the HW processing unit 142a may execute the STL 132 and may complete the execution at time T1. At time T2, the timer may expire as shown by 306. Responsive to the timer expiration 306, the HW processing unit 142a may again execute the STL 132 and may complete the execution at time T3. At time T5, the timer may expire as shown by 308. Responsive to the timer expiration 308, the HW processing unit 142a may again execute the STL 132. In general, the HW processing unit 142a may repeat the execution of the STL 132 at every timer expiration (e.g., periodically). In some aspects, to test the hardware compute resources of the HW processing unit 142a, the STL 132 may execute an instruction (used by the AV compute software 110) and may monitor for a certain computed value or a response time to determine whether there is a hardware fault the processing unit 142a.

When the STL 132 is not in progress, the HW processing unit 142 may execute the AV compute software 110. As shown, at time T1, the HW processing unit 142 may execute the AV compute software 110 (e.g., part 1). Responsive to the timer expiration 306 at time T2, the HW processing unit 142a may stop execution of the AV compute software 110 and switch to execute the STL 132. At time T3, upon completing the execution of the STL 132, the HW processing unit 142a may switch to resume the execution of the AV compute software 110 (part 2). Upon completing the execution of the AV compute software 110 (part 2) at time T4, the HW processing unit 142a may not start the execution of the STL 132 until the timer is expired at time T5. At time T6, after completing the execution of the STL 132 at T6, the HW processing unit 142 may execute the AV compute software 110 (part 3). The alternating executions of the STL 132 and the AV compute software 110 may continue in a substantially similar manner. In general, the execution of the AV compute software 110 may take any suitable amount of time and yield to the execution of the STL 132 whenever the timer expires. In other words, the STL 132 may have a higher execution priority than the AV compute software 110.

As explained above, the STL 132 may test the hardware resources (for hardware coverage testing) used for executing the AV compute software 110. In some aspects, the timer period 302 may be configured according to a certain response time as required by a hardware coverage test. For example, if a certain hardware coverage test is expected to report or alert a HW fault within 100 ms upon detecting the HW fault, the timer period 302 can be configured to 100 ms. As another example, if a certain hardware coverage test is expected to report or alert a HW fault within 200 ms upon detecting the HW fault, the timer period 302 can be configured to 200 ms. In some instances, a certain functional safety standard (e.g., the ISO 26262) may define an expected response time for reporting or alerting a HW fault upon detecting the HW fault. Accordingly, the timer period 302 may be configured according to the standard.

In some aspects, each of the HW processing units 142 that is used by the AV compute software 110 may be have a similar execution pattern as in shown in FIG. 3. In other aspects, different HW processing units 142 may execute a part of the STL 132 at the same frequency or periodicity but offset in time.

Figure 4:
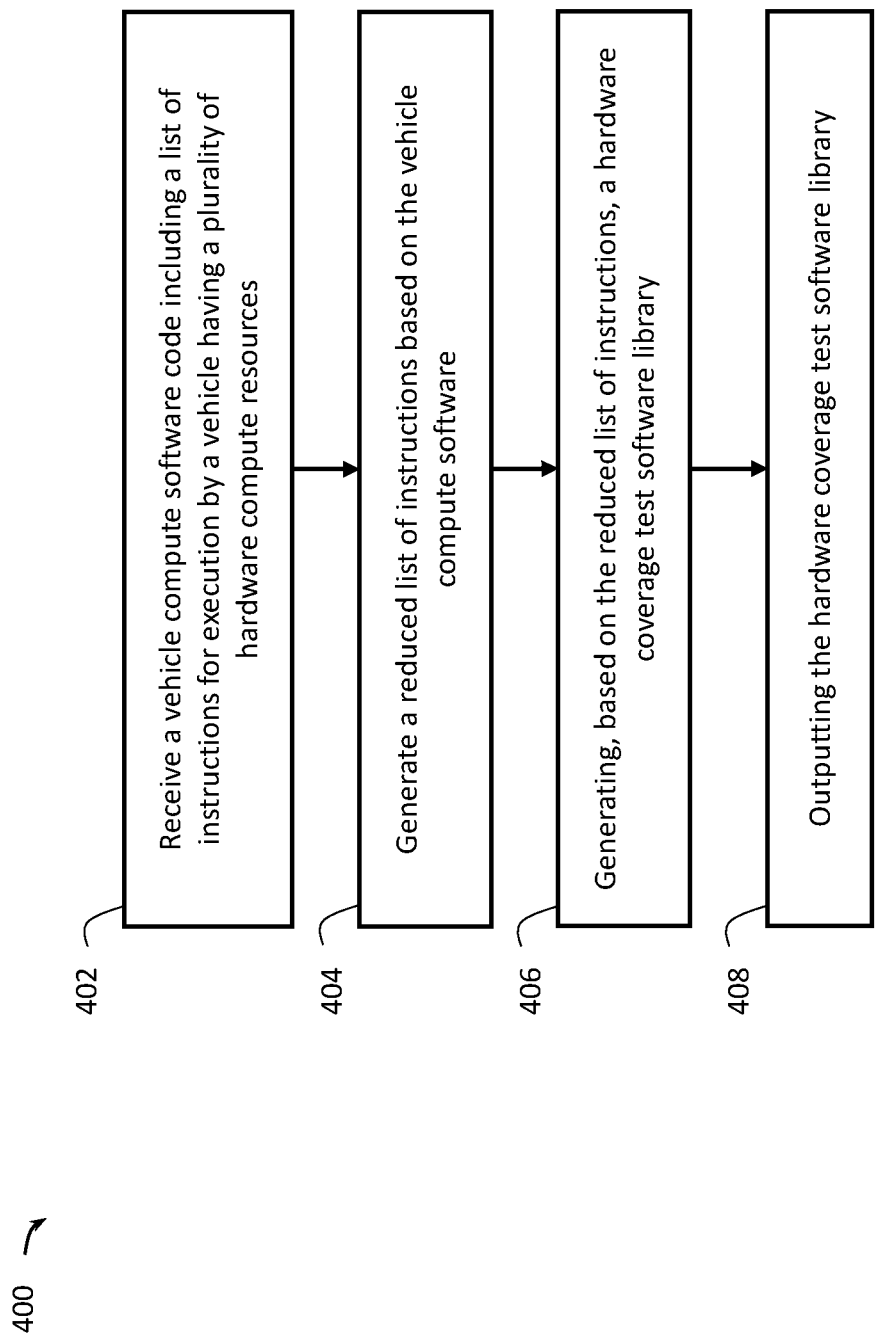
FIG. 4 is a flow diagram illustrating a process for generating an STL for AV hardware coverage testing, according to some examples of the present disclosure.

FIG. 4 is a flow diagram illustrating a process 400 for generating an STL (e.g., the STLs 132 and/or 250) for AV hardware coverage testing, according to some examples of the present disclosure. The process 400 can be implemented by a computer-implemented system such as the system 700 of FIG. 7. For instance, the computer-implemented system may include one or more non-transitory computer-readable media storing instructions, when executed by one or more processing units (e.g., the processor 710), cause the one or more processing units to perform operations of the process 400. In general, the process 400 may be performed using any suitable hardware components and/or software components. The process 400 may utilize similar mechanisms discussed above with reference to FIGS. 1-3. Operations are illustrated once each and in a particular order in FIG. 4, but the operations may be performed in parallel, reordered, and/or repeated as desired.

At 402, the computer-implemented system may receive a vehicle compute software code (e.g., the AV compute software 110 and/or 210) including a list of instructions for execution by a vehicle (e.g., the AV 102 and/or 602) having a plurality of hardware compute resources (e.g., the HW processing units 142).

At 404, the computer-implemented system may generate, based on the list of instructions, a reduced list of instructions. As part of generating the reduced list of instructions, the computer-implemented system may remove at least a first instruction from the list of instructions. The removal may be based on a second instruction in the list of instructions uses the same hardware compute resource of the plurality of hardware compute resources as the first instruction, for example, as discussed above with reference to FIG. 2.

At 406, the computer-implemented system may generate, based on the reduced list of instructions, a hardware coverage test software (e.g., the STLs 132 and/or 250).

At 408, the computer-implemented system may output the hardware coverage test software. For instance, the hardware coverage test software can be deployed in the vehicle along with vehicle compute software for execution during operation.

In some aspects, the vehicle compute software may be compiled by a compiler, and the computer-implemented system may further determine, based on the compiler output, that the first instruction and the second instruction use the same hardware compute resource. In an example, the compiler output may include a HW resource map similar to the HW resource map 124.

In some aspects, the first instruction may operate on a first operand, and the removing the first instruction from the list of instructions at 404 may be further based on the second instruction operates on a second operand having the same operand type as the first operand. As an example, the first instruction and the second instruction may be of the same instruction type (e.g., a MAC instruction) and both instructions may perform MAC operations for the same data type (e.g., 8-bit operands).

In some aspects, the first instruction may be associated with an ML operation (e.g., a filtering operation, an MSE calculation, a matrix operation, etc.), and the removing the first instruction at 404 may be further based on the second instruction is associated with the same ML operation.

In some aspects, the execution of the vehicle compute software code may use a subset of the plurality of hardware compute resources that is less than all of the plurality of hardware compute resources of the vehicle, and the hardware coverage test software library may include instructions that use the subset of the plurality of hardware compute resources. In other words, the hardware coverage test software library may not test hardware resources outside of the subset since they are not used by the vehicle compute software.

In some aspects, the vehicle compute software code may include one or more ML models (e.g., the ML models 112) associated with at least one of a perception of an environment, a prediction, a path planning, or a vehicle control, for example, as discussed above with reference to FIG. 1.

In some aspects, the generating the hardware coverage test software library at 406 may be further based on a target hardware coverage (e.g., testing a certain percentage of the hardware. In some aspects, the target hardware coverage may be based on a functional safety standard (e.g., ISO 26262).

In some aspects, the computer-implemented system may further determine that the first instruction and the second instruction uses the same hardware compute resource based on the first instruction and the second instruction are to be executed by the same GPU at the vehicle. That is, the computer-implemented system may generate the hardware coverage test library to test hardware resources at a GPU level. In some aspects, the computer-implemented system may further determine that the first instruction and the second instruction uses the same hardware compute resource based on the first instruction and the second instruction are to be executed by the same math processing unit within a GPU at the vehicle. That is, the computer-implemented system may generate the hardware coverage test library to test hardware resources at a finer granularity than at a GPU level. The computer-implemented system may determine which of the math processing unit among a GPU is used by the first instruction and the second instruction.

Figure 5:
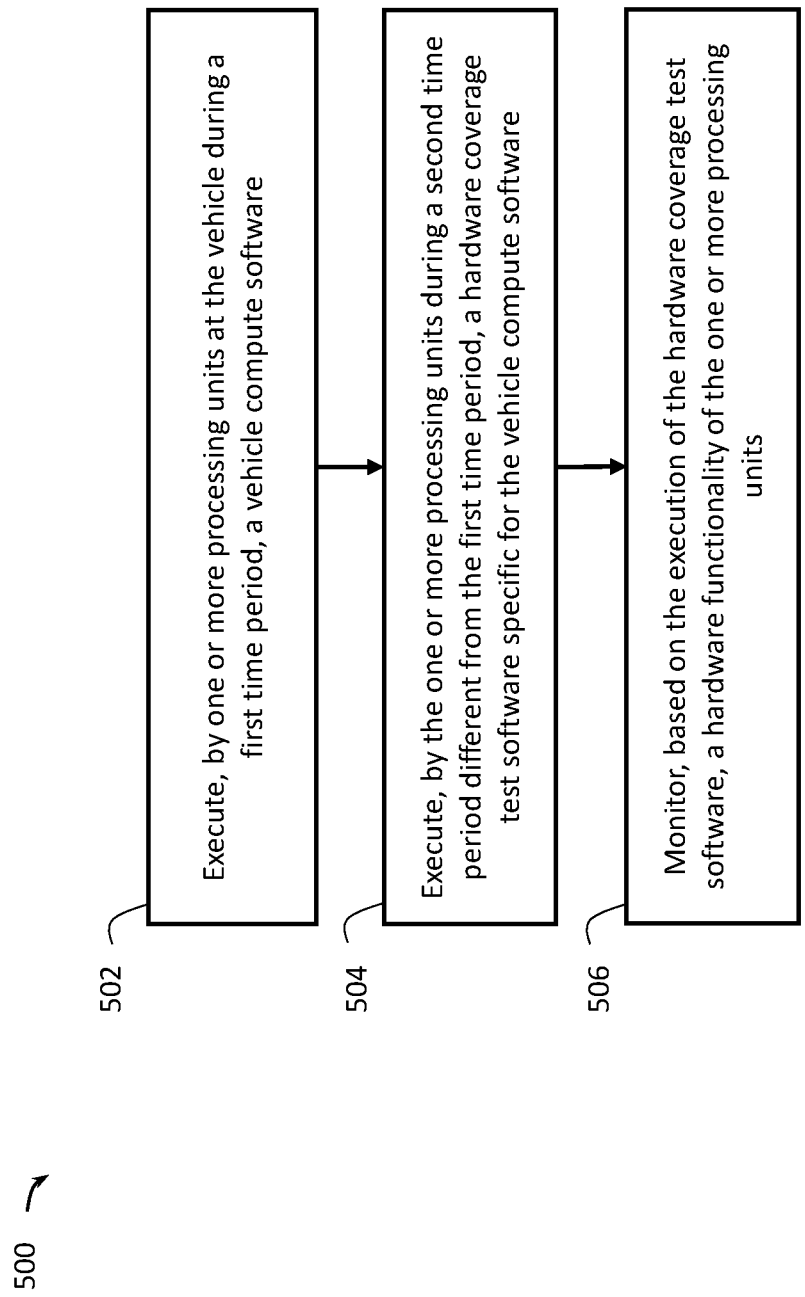
FIG. 5 is a flow diagram illustrate a process for operating an AV with built-in AV hardware coverage testing during operation, according to some examples of the present disclosure.

FIG. 5 is a flow diagram illustrate a process 500 for operating an AV with built-in AV hardware coverage testing during operation, according to some examples of the present disclosure. The process 500 can be implemented by a vehicle onboard computer (e.g., the onboard computer 140 of FIG. 1, the local computing device 610 of FIG. 6, and/or the system 700 of FIG. 7). In general, the process 500 may be performed using any suitable hardware components and/or software components. The process 500 may utilize similar mechanisms discussed above with reference to FIGS. 1-3. Operations are illustrated once each and in a particular order in FIG. 3-5, but the operations may be performed in parallel, reordered, and/or repeated as desired.

At 502, the vehicle may execute a vehicle compute software (e.g., the AV compute software 110 and/or 210) during a first time period using one or more processing units of the vehicle.

At 504, the vehicle may execute a hardware coverage test software (e.g., the STLs 132 and/or 250) during a second time period using the one or more processing units. The hardware coverage test software may be generated specifically for the vehicle compute software based on instructions and/or data used by the vehicle compute software. For example, the hardware coverage test software may be generated using the scheme 200 discussed above with reference to FIG. 2. The second time period may be different from the first time period. That is, the execution of the vehicle compute software and the hardware coverage test software may be multiplexed in time. In some aspects, the executing the hardware coverage test software may be triggered by a timer expiration, for example, as discussed above with reference to FIG. 3.

At 506, the vehicle may monitor a hardware functionality of the one or more processing units based on the execution of the hardware coverage test software.

In some aspects, the executing the vehicle compute software at 502 may use at least a subset of math processing resources of the one or more processing units, and the monitoring at 506 may include monitoring the hardware functionality of at least the subset of math processing resources based on the execution of the hardware coverage test software. In some aspects, the executing the vehicle compute software at 502 may use a subset of math processing resources of the one or more processing units less than all of the math processing resources, and the monitoring at 506 may include monitoring the hardware functionality of the subset of math processing resources less than all of the math processing resources based on the execution of the hardware coverage test software.

In some aspects, the hardware coverage test software may include a reduced list of instructions based on instructions in the vehicle compute software. In some aspects, the hardware coverage test software may include a single instance of each of a plurality of instruction types used by the vehicle compute software. For instance, different hardware compute resources may be used to execute different instruction types. Accordingly, including a single instance of each instruction types used by the vehicle compute software in the hardware coverage test software may exercise or invoke each of the hardware compute resources used by the vehicle compute software at least once (e.g., for HW fault detection).

In some aspects, the hardware coverage test software may include a single instance of each of a plurality of instruction types used by a plurality of ML models (e.g., the ML models 112) in the vehicle compute software.

In some aspects, the vehicle may further configure a timer at the vehicle with a timer period based on a functional safety standard (e.g., the ISO 26262), and the timer expiration that triggers the executing the hardware coverage test software at 504 may be based on the timer period. In an example, the timer period may be set to a HW fault response time specified by the functional safety standard, where the HW fault response time may correspond to the duration beginning at a time when a HW fault is detected to the time the HW fault is reported. In some aspects, the executing the hardware coverage test software may be based on periodic schedule. In some instances, the periodic schedule may be daily schedule. For example, the vehicle may execute the hardware coverage test software every morning.

In some aspects, the vehicle may further report a HW fault associated with the one or more processing units responsive to the monitoring at 506. The report may be sent to a HW safety handler (e.g., the HW safety handler component 146) of the vehicle.

Figure 6:
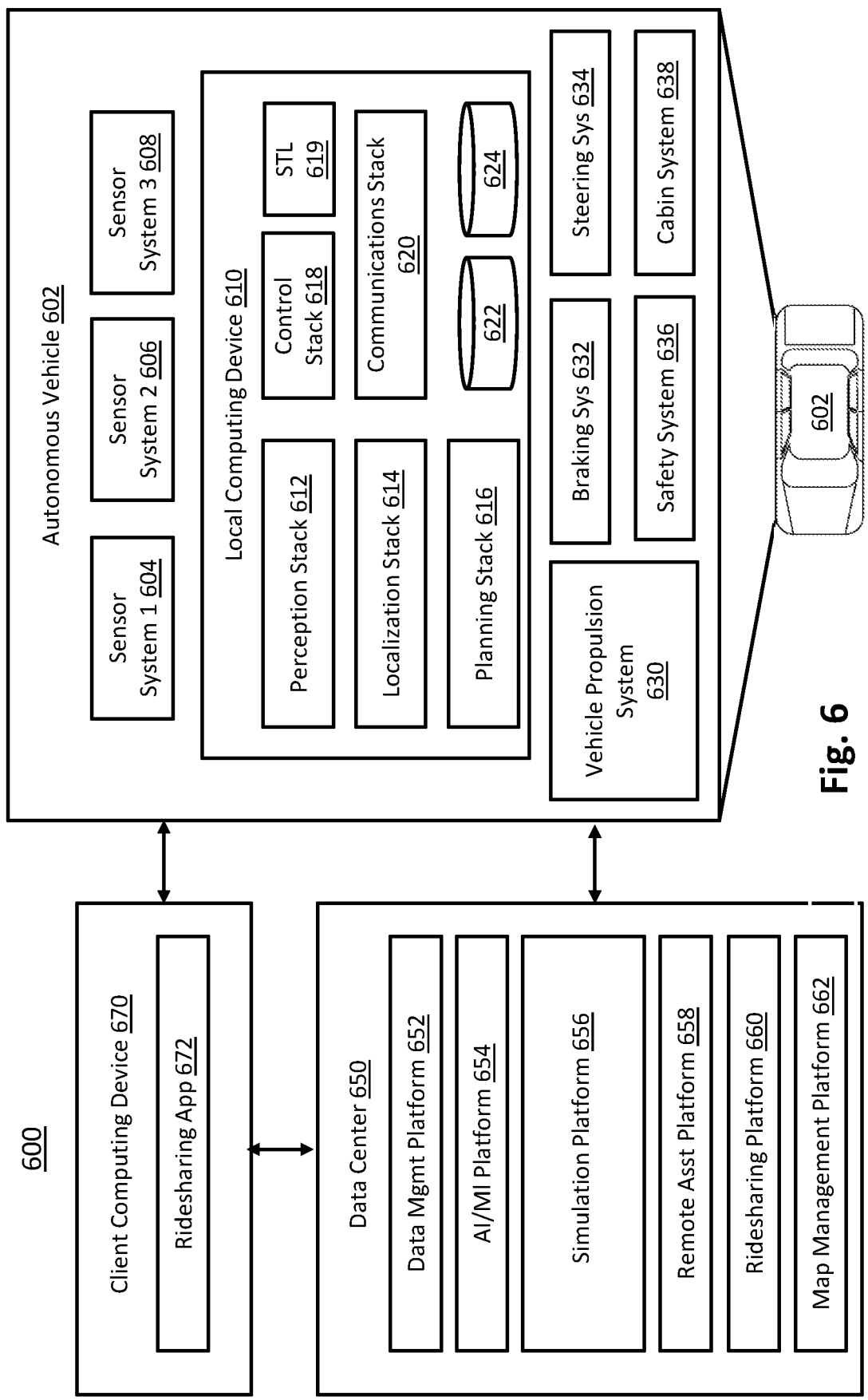
FIG. 6 illustrates an example system environment that may be used to facilitate AV dispatch and operations, according to some aspects of the disclosed technology.

Turning now to FIG. 6, this figure illustrates an example of an AV management system 600. One of ordinary skill in the art will understand that, for the AV management system 600 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 may navigate about roadways without a human driver based on sensor signals generated by multiple sensor systems 604, 606, and 608. The sensor systems 604-608 may include different types of sensors and may be arranged about the AV 602. For instance, the sensor systems 604-608 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 may be a camera system, the sensor system 606 may be a LIDAR system, and the sensor system 608 may be a RADAR system. Other embodiments may include any other number and type of sensors.

AV 602 may also include several mechanical systems that may be used to maneuver or operate AV 602. For instance, the mechanical systems may include vehicle propulsion system 630, braking system 632, steering system 634, safety system 636, and cabin system 638, among other systems. Vehicle propulsion system 630 may include an electric motor, an internal combustion engine, or both. The braking system 632 may include an engine brake, a wheel braking system (e.g., a disc braking system that utilizes brake pads), hydraulics, actuators, and/or any other suitable componentry configured to assist in decelerating AV 602. The steering system 634 may include suitable componentry configured to control the direction of movement of the AV 602 during navigation. Safety system 636 may include lights and signal indicators, a parking brake, airbags, and so forth. The cabin system 638 may include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 may include one or more client interfaces (e.g., Graphical User Interfaces (GUIs), Voice User Interfaces (VUIs), etc.) for controlling certain aspects of the mechanical systems 630-638.

AV 602 may additionally include a local computing device 610 that is in communication with the sensor systems 604-608, the mechanical systems 630-638, the data center 650, and the client computing device 670, among other systems. The local computing device 610 may include one or more processors and memory, including instructions that may be executed by the one or more processors. The instructions may make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, an STL 619, a communications stack 620, a High Definition (HD) geospatial database 622, and an AV operational database 624, among other stacks and systems.

Perception stack 612 may enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 may detect and classify objects and determine their current and predicted locations, speeds, directions, and the like. In addition, the perception stack 612 may determine the free space around the AV 602 (e.g., to maintain a safe distance from other objects, change lanes, park the AV, etc.). The perception stack 612 may also identify environmental uncertainties, such as where to look for moving objects, flag areas that may be obscured or blocked from view, and so forth.

Mapping and localization stack 614 may determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 may compare sensor data captured in real-time by the sensor systems 604-608 to data in the HD geospatial database 622 to determine its precise (e.g., accurate to the order of a few centimeters or less) position and orientation. The AV 602 may focus its search based on sensor data from one or more first sensor systems (e.g., GPS) by matching sensor data from one or more second sensor systems (e.g., LIDAR). If the mapping and localization information from one system is unavailable, the AV 602 may use mapping and localization information from a redundant system and/or from remote data sources.

The planning stack 616 may determine how to maneuver or operate the AV 602 safely and efficiently in its environment. For example, the planning stack 616 may receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 may determine multiple sets of one or more mechanical operations that the AV 602 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 may select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 may manage the operation of the vehicle propulsion system 630, the braking system 632, the steering system 634, the safety system 636, and the cabin system 638. The control stack 618 may receive sensor signals from the sensor systems 604-608 as well as communicate with other stacks or components of the local computing device 610 or a remote system (e.g., the data center 650) to effectuate operation of the AV 602. For example, the control stack 618 may implement the final path or actions from the multiple paths or actions provided by the planning stack 616. Implementation may involve turning the routes and decisions from the planning stack 616 into commands for the actuators that control the AV's steering, throttle, brake, and drive unit.

In some aspects, the perception stack 612, the localization stack 614, the planning stack 616, and the control stack 618 may be part of as an AV compute software (e.g., similar to the AV compute software 110 of FIG. 1 or the AV compute software 210 of FIG. 2), and the STL 619 may be generated as discussed herein for testing the hardware resources used for executing the AV compute software. Further, the AV compute software and the STL 619 may be executed in a time-slicing manner as discussed herein. In certain aspects, the local computing device 610 may include a timer configured with a timer period in accordance with a fault response time as specified by a functional safety standard (e.g., the ISO 26262), and the STL 619 may be executed in response to an expiration of the timer as discussed herein.

The communication stack 620 may transmit and receive signals between the various stacks and other components of the AV 602 and between the AV 602, the data center 650, the client computing device 670, and other remote systems. The communication stack 620 may enable the local computing device 610 to exchange information remotely over a network, such as through an antenna array or interface that may provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 may also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 may store HD maps and related data of the streets upon which the AV 602 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer may include geospatial information of traffic signal lights, traffic signs, and other road objects and related attributes.

The AV operational database 624 may store raw AV data generated by the sensor systems 604-608 and other components of the AV 602 and/or data received by the AV 602 from remote systems (e.g., the data center 650, the client computing device 670, etc.). In some embodiments, the raw AV data may include HD LIDAR point cloud data, image or video data, RADAR data, GPS data, and other sensor data that the data center 650 may use for creating or updating AV geospatial data.

The data center 650 may be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 may include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 may send and receive various signals to and from the AV 602 and the client computing device 670. These signals may include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 may access data stored by the data management platform 652 to provide their respective services.

The AI/ML platform 654 may provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists may prepare data sets from the data management platform 652; select, design, and train machine learning models; evaluate, refine, and deploy the models; maintain, monitor, and retrain the models; and so on.

The simulation platform 656 may enable testing and validation of the algorithms, machine learning models, neural networks, and other development efforts for the AV 602, the remote assistance platform 658, the ridesharing platform 660, the map management platform 662, and other platforms and systems. The simulation platform 656 may replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 may generate and transmit instructions regarding the operation of the AV 602. For example, in response to an output of the AI/ML platform 654 or other system of the data center 650, the remote assistance platform 658 may prepare instructions for one or more stacks or other components of the AV 602.

The ridesharing platform 660 may interact with a customer of a ridesharing service via a ridesharing application 672 executing on the client computing device 670. The client computing device 670 may be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 may be a customer's mobile computing device or a computing device integrated with the AV 602 (e.g., the local computing device 610). The ridesharing platform 660 may receive requests to be picked up or dropped off from the ridesharing application 672 and dispatch the AV 602 for the trip.

Map management platform 662 may provide a set of tools for the manipulation and management of geographic and spatial (geospatial) and related attribute data. The data management platform 652 may receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data may be processed, and map management platform 662 may render base representations (e.g., tiles (2D), bounding volumes (3D), etc.) of the AV geospatial data to enable users to view, query, label, edit, and otherwise interact with the data. Map management platform 662 may manage workflows and tasks for operating on the AV geospatial data. Map management platform 662 may control access to the AV geospatial data, including granting or limiting access to the AV geospatial data based on user-based, role-based, group-based, task-based, and other attribute-based access control mechanisms. Map management platform 662 may provide version control for the AV geospatial data, such as to track specific changes that (human or machine) map editors have made to the data and to revert changes when necessary. Map management platform 662 may administer release management of the AV geospatial data, including distributing suitable iterations of the data to different users, computing devices, AVs, and other consumers of HD maps. Map management platform 662 may provide analytics regarding the AV geospatial data and related data, such as to generate insights relating to the throughput and quality of mapping tasks.

In some embodiments, the map viewing services of map management platform 662 may be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

FIG. 7 illustrates an example processor-based system with which some aspects of the subject technology may be implemented. For example, processor-based system 700 may be any computing device making up, or any component thereof in which the components of the system are in communication with each other using connection 705. Connection 705 may be a physical connection via a bus, or a direct connection into processor 710, such as in a chipset architecture. Connection 705 may also be a virtual connection, networked connection, or logical connection.

In some embodiments, computing system 700 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 may include a cache of high-speed memory 712 connected directly with, in close proximity to, or integrated as part of processor 710.

Processor 710 may include any general-purpose processor and a hardware service or software service, such as an AV compute software 732 (e.g., similar to the AV compute software 110 of FIG. 1 or the AV compute software 210 of FIG. 2) and an STL generation block 733 (e.g., similar to the STL generation block 130 of FIG. 1) stored in storage device 730, configured to control processor 710 as well as a special-purpose processor where software instructions are incorporated into the actual processor design. The STL generation block 733 may generate an STL for testing vehicle hardware compute resources that are used for executing the AV compute software 732 for functional safety as discussed herein. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which may represent any number of input mechanisms, such as a microphone for speech, a touch-sensitive screen for gesture or graphical input, keyboard, mouse, motion input, speech, etc. Computing system 700 may also include output device 735, which may be one or more of a number of output mechanisms known to those of skill in the art. In some instances, multimodal systems may enable a user to provide multiple types of input/output to communicate with computing system 700. Computing system 700 may include communications interface 740, which may generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 may include software services, servers, services, etc., that when the code that defines such software is executed by the processor 710, it causes the system 700 to perform a function. In some embodiments, a hardware service that performs a particular function may include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 includes a vehicle including a memory to store a vehicle compute software; and a hardware coverage test software associated with (e.g., designed specifically or customized for) the vehicle compute software; a timer configured based on a timer period; and one or more processing units to execute the vehicle compute software using hardware resources of the one or more processing units; and responsive to an expiration of the timer, execute the hardware coverage test software to determine whether there is a failure associated with the hardware resources used by the vehicle compute software.

Example 2 includes the vehicle of example 1, where the hardware coverage test software includes a reduced list of instructions based on instructions in the vehicle compute software.

Example 3 includes the vehicle of any one of examples 1-2, where the vehicle compute software includes at least a first instruction and a second instruction that are executed by the same hardware resource of the hardware resources; and the hardware coverage test software includes the first instruction but not the second instruction based on the second instruction is executed by the same hardware resource as the first instruction.

Example 4 includes the vehicle of any one of examples 1-3, where the vehicle compute software includes one or more machine learning (ML) models, the one or more ML models utilizing instructions of different instruction types provided by the one or more processing units; and the hardware coverage test software includes a single instruction instance of each of the different instruction types.

Example 5 includes the vehicle of any one of examples 1-4, where the one or more ML models are associated with at least one of a perception of an environment surrounding the vehicle, a prediction, a path planning, or a vehicle control.

Example 6 includes the vehicle of any one of examples 1-5, where the timer that generates the expiration to which the executing the hardware coverage test software is responsive is a periodic timer.

Example 7 includes the vehicle of any one of examples 1-6, where the timer period is based on a functional safety standard.

Example 8 includes the vehicle of any one of examples 1-7, where the timer period is based on international organization for standardization (ISO) 26262.

Example 9 includes the vehicle of any one of examples 1-8, where the one or more processing units includes one or more graphical processing units (GPUs).

Example 10 includes the vehicle of any one of examples 1-9, further including one or more machine learning (ML) engines, where the one or more processing units are part of the one or more ML engines.

Example 11 includes the vehicle of any one of examples 1-10, where the hardware resources used for executing the vehicle compute software and the hardware coverage test software includes a subset of a plurality of math processing units less than all of the math processing units in the one or more processing units.

Example 12 includes the vehicle of any one of examples 1-11, where the one or more processing units further execute the hardware coverage test software using the hardware resources based on a daily schedule.

Example 13 includes the vehicle of any one of examples 1-12, further including a hardware failure handling component, where the one or more processing units further responsive to determining an occurrence of the failure associated with the hardware resources, report the failure to the hardware failure handling component.

Example 14 includes a computer-implemented system, including one or more non-transitory computer-readable media storing instructions, when executed by one or more processing units, cause the one or more processing units to perform operations including receiving a vehicle compute software code including a list of instructions for execution by a vehicle having a plurality of hardware compute resources; generating, based on the list of instructions, a reduced list of instructions, where the generating includes removing at least a first instruction from the list of instructions based on a second instruction in the list of instructions uses the same hardware compute resource of the plurality of hardware compute resources as the first instruction; generating, based on the reduced list of instructions, a hardware coverage test software library; and outputting the hardware coverage test software library.

Example 15 includes the computer-implemented system of example 14, where the operations further includes determining, based on a compiler output for the vehicle compute software code, that the first instruction and the second instruction use the same hardware compute resource.

Example 16 includes the computer-implemented system of any one of examples 14-15, where the first instruction operates on a first operand; and the removing the first instruction from the list of instructions is further based on the second instruction operates on a second operand having the same operand type as the first operand.

Example 17 includes the computer-implemented system of any one of examples 14-16, where the first instruction is associated with a machine learning operation; and the removing the first instruction is further based on the second instruction is associated with the same machine learning operation.

Example 18 includes the computer-implemented system of any one of examples 14-17, where the execution of the vehicle compute software uses a subset of the plurality of hardware compute resources that is less than all of the plurality of hardware compute resources of the vehicle; and the hardware coverage test software library includes instructions that use the subset of the plurality of hardware compute resources.

Example 19 includes the computer-implemented system of any one of examples 14-18, where the vehicle compute software code includes one or more machine learning (ML) models associated with at least one of a perception of an environment, a prediction, a path planning, or a vehicle control.

Example 20 includes the computer-implemented system of any one of examples 14-19, where the generating the hardware coverage test software library is further based on a target hardware coverage.

Example 21 includes the computer-implemented system of any one of examples 14-20, where the target hardware coverage used for generating the hardware coverage test software library is based on a functional safety standard.

Example 22 includes the computer-implemented system of any one of examples 14-21, where the target hardware coverage used for generating the hardware coverage test software library is based on international organization for standardization (ISO) 26262.

Example 23 includes the computer-implemented system of any one of examples 14-22, where the operations further include determining the first instruction and the second instruction uses the same hardware compute resource based on the first instruction and the second instruction are to be executed by the same graphical processing unit (GPU) at the vehicle.

Example 24 includes the computer-implemented system of any one of examples 14-23, where the operations further include determining the first instruction and the second instruction uses the same hardware compute resource based on the first instruction and the second instruction are to be executed by the same math processing unit of a graphical processing unit (GPU) at the vehicle.

Example 25 includes a method performed by a vehicle, the method including executing, by one or more processing units at the vehicle, a vehicle compute software during a first time period; executing, by the one or more processing units, a hardware coverage test software during a second time period different from the first time period; and monitoring, based on the execution of the hardware coverage test software, a hardware functionality of the one or more processing units.

Example 26 includes the method of example 25, where the executing the vehicle compute software uses at least a subset of math processing resources of the one or more processing units; and the monitoring includes monitoring, based on the execution of the hardware coverage test software, the hardware functionality of at least the subset of math processing resources.

Example 27 includes the method of any one of examples 25-26, where the vehicle compute software includes a greater number of instructions than the hardware coverage test software.

Example 28 includes the method of any one of examples 25-27, where the hardware coverage test software includes a single instance of each of a plurality of instruction types used by the vehicle compute software.

Example 29 includes the method of any one of examples 25-28, where the hardware coverage test software includes a single instance of each of a plurality of instruction types used by a plurality of machine learning (ML) models in the vehicle compute software.

Example 30 includes the method of any one of examples 25-29, where the executing the hardware coverage test software is triggered by a timer expiration.

Example 31 includes the method of any one of examples 25-30, further including configuring, based on a functional safety standard, a timer period for a timer of the vehicle, where the timer expiration that triggers the executing the hardware coverage test software is based on the timer period.

Example 32 includes the method of any one of examples 25-31, where the executing the hardware coverage test software is based on periodic schedule.

Example 33 includes the method of any one of examples 25-32, further including reporting a hardware fault associated with the one or more processing units responsive to the monitoring.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

The invention claimed is:

1. A vehicle comprising:
   a memory to store:
     a vehicle compute software; and
     a hardware coverage test software associated with the vehicle compute software;
     a timer configured based on a timer period; and
   one or more processing units to:
     execute the vehicle compute software using hardware resources of the one or more processing units; and
     responsive to an expiration of the timer, execute the hardware coverage test software to determine whether there is a failure associated with the hardware resources used by the vehicle compute software,
   wherein:
     the vehicle compute software includes one or more machine learning (ML) models, the one or more ML models utilizing instructions of different instruction types provided by the one or more processing units, and
     the hardware coverage test software includes a single instruction instance of each of the different instruction types.

2. The vehicle of claim 1, wherein the hardware coverage test software includes a reduced list of instructions based on instructions in the vehicle compute software.

3. The vehicle of claim 1, wherein:
   the vehicle compute software includes at least a first instruction and a second instruction that are executed by the same hardware resource of the hardware resources; and the hardware coverage test software includes the first instruction but not the second instruction based on the second instruction is executed by the same hardware resource as the first instruction.

4. The vehicle of claim 1, wherein the timer that generates the expiration to which the executing the hardware coverage test software is responsive is a periodic timer.

5. The vehicle of claim 1, wherein the timer period is based on a functional safety standard.

6. The vehicle of claim 1, wherein the one or more processing units comprises one or more graphical processing units (GPUs).

7. The vehicle of claim 1, further comprising:
one or more engines, wherein the one or more processing units are part of the one or more ML engines.

8. A computer-implemented system, comprising:
one or more processing units; and
one or more non-transitory computer-readable media storing instructions, when executed by the one or more processing units, cause the one or more processing units to perform operations comprising:
receiving a vehicle compute software code including a list of instructions for execution by a vehicle having a plurality of hardware compute resources;
generating, based on the list of instructions, a reduced list of instructions, wherein the generating comprises removing at least a first instruction from the list of instructions based on a second instruction in the list of instructions uses the same hardware compute resource of the plurality of hardware compute resources as the first instruction;
generating, based on the reduced list of instructions, a hardware coverage test software library; and
outputting the hardware coverage test software library, wherein:
the first instruction is associated with a machine learning (ML) operation, and
the removing the first instruction is further based on the second instruction is associated with the same ML operation.

9. A computer-implemented system, comprising:
one or more processing units; and
one or more non-transitory computer-readable media storing instructions, when executed by the one or more processing units, cause the one or more processing units to perform operations comprising:
receiving a vehicle compute software code including a list of instructions for execution by a vehicle having a plurality of hardware compute resources;
generating, based on the list of instructions, a reduced list of instructions, wherein the generating comprises removing at least a first instruction from the list of instructions based on a second instruction in the list of instructions uses the same hardware compute resource of the plurality of hardware compute resources as the first instruction;
generating, based on the reduced list of instructions, a hardware coverage test software library; and
outputting the hardware coverage test software library.

10. The computer-implemented system of claim 9, wherein:
the first instruction operates on a first operand; and
the removing the first instruction from the list of instructions is further based on the second instruction operates on a second operand having the same operand type as the first operand.

11. The computer-implemented system of claim 9, wherein:
the execution of the vehicle compute software uses a subset of the plurality of hardware compute resources that is less than all of the plurality of hardware compute resources of the vehicle; and
the hardware coverage test software library includes instructions that use the subset of the plurality of hardware compute resources.

12. The computer-implemented system of claim 9, wherein the generating the hardware coverage test software library is further based on a target hardware coverage.

13. The computer-implemented system of claim 9, wherein the operations further comprise:
determining the first instruction and the second instruction uses the same hardware compute resource based on at least one of:
the first instruction and the second instruction are to be executed by the same graphical processing unit (GPU) at the vehicle; or
the first instruction and the second instruction are to be executed by the same math processing unit within of a GPU at the vehicle.

14. A method performed by a vehicle, the method comprising:
executing, by one or more processing units at the vehicle during a first time period, a vehicle compute software;
executing, by the one or more processing units during a second time period different from the first time period, a hardware coverage test software specific for the vehicle compute software; and
monitoring, based on the execution of the hardware coverage test software, a hardware functionality of the one or more processing units,
wherein:
the vehicle compute software includes one or more machine learning (ML) models, the one or more ML models utilizing instructions of different instruction types provided by the one or more processing units, and
the hardware coverage test software includes a single instruction instance of each of the different instruction types.

15. The method of claim 14, wherein:
the executing the vehicle compute software uses at least a subset of math processing resources of the one or more processing units; and
the monitoring comprises:
monitoring, based on the execution of the hardware coverage test software, the hardware functionality of at least the subset of math processing resources.

16. The method of claim 14, wherein the vehicle compute software includes a greater number of instructions than the hardware coverage test software.

17. The method of claim 14, wherein the hardware coverage test software includes a single instance of each of a plurality of instruction types used by the vehicle compute software.

18. The method of claim 14, wherein the executing the hardware coverage test software is triggered by a timer expiration.

* * * * *